No. 804,441. PATENTED NOV. 14, 1905.
P. STIENS.
APPARATUS FOR THE MANUFACTURE OF GENERATOR GAS.
APPLICATION FILED SEPT. 1, 1904.
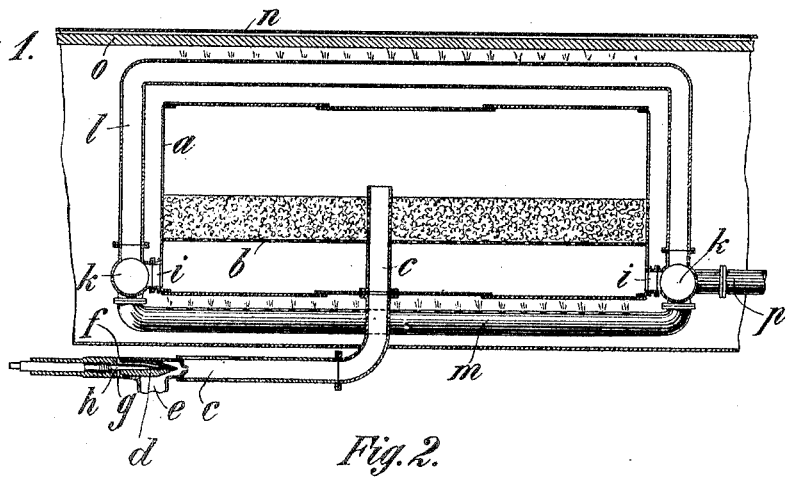
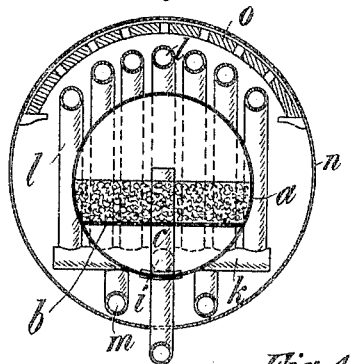
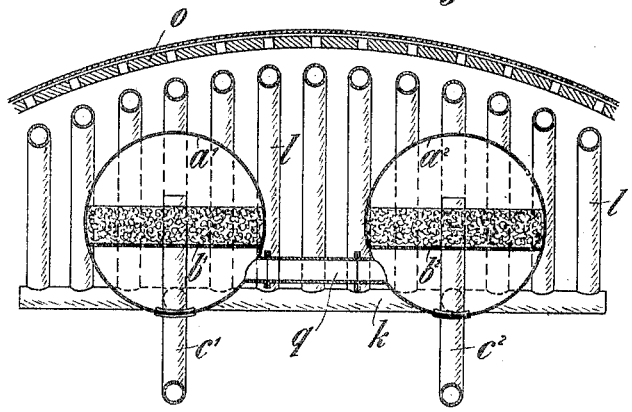
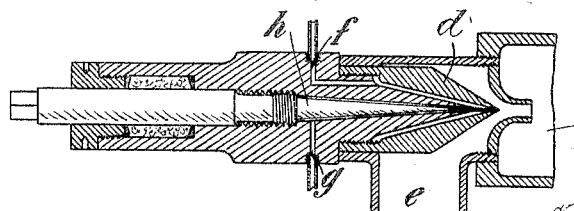
Witnesses: Inventor:
Peter Stiens

UNITED STATES PATENT OFFICE.

PETER STIENS, OF ROTTERDAM, NETHERLANDS.

APPARATUS FOR THE MANUFACTURE OF GENERATOR-GAS.

No. 804,441. Specification of Letters Patent. Patented Nov. 14, 1905.

Application filed September 1, 1904. Serial No. 222,923.

*To all whom it may concern:*

Be it known that I, PETER STIENS, a citizen of Germany, and a resident of Rotterdam, Netherlands, have invented certain new and useful Improvements in Apparatus for the Manufacture of Generator-Gas, of which the following is a specification.

This invention relates to an apparatus for the manufacture of generator-gas by the decomposition of water by means of incandescent reducing substances, such as carbonaceous material, which process is distinguished from the known apparatus in that a part of the gas produced by means of a supply of liquid combustible is employed to make good the losses of heat resulting from the decomposition of the water in the layer of reducing material. It is of advantage to arrange the gas-generator directly within the combination-chamber heated by the combustion of the gases produced, so that the heat of the escaping waste gases and the radiated heat of the combustion-chamber shall assist in heating the gas-generator. A certain quantity of liquid combustible, such as petroleum, is supplied with the water to the generator, in which so much gas is produced that there is a sufficient quantity thereof in excess of the quantity required for the main purpose of its use for maintaining the layer of reducing material in the necessary state of incandescence.

On the accompanying drawings are shown diagrammatically two arrangements of apparatus for carrying out the said process, in which the gas-generator is situated within the combustion-chamber.

Figure 1 shows a longitudinal section, and Fig. 2 a cross-section, of one construction in which the gas-generator is arranged in the combustion-chamber or fire-tube of a steam-boiler. Fig. 3 is a detail of the injector device, and Fig. 4 shows a cross-section through a gas-generator having two chambers.

In the arrangement at Figs. 1 and 2 a gas-generator vessel or chamber $a$ is divided by a grate or perforated partition $b$ into two compartments. Above the grate is situated the layer of reducing material, which consists advantageously of retort-carbon that combines considerable hardness with a great degree of porosity. Other suitable materials—such as coal, metallic iron, or the like—may, however, be used. With the space above the grate communicates a feed-pipe $c$, by means of which a mixture of water, petroleum, and air is introduced. The water enters the pipe $d$ in the form of a jet and sucks in a sufficient quantity of air through the branch $e$. By means of a suitable injector-like device, which is connected at $f$ to the water-supply and at $g$ to a petroleum-tank, a combined jet of water and petroleum is produced, the volume of which is regulated or which is entirely cut off by means of a needle-valve $h$, the proportion between the water and petroleum being maintained constant. Below the grate $b$ there is provided at each end of the generator-chamber a discharge branch $i$, each leading to a transverse pipe $k$, which pipes are connected together by a number of U-shaped branch pipes $l$. These pipes pass along over the top of the generator and have at top a row of openings through which the gas generated issues. Other pipes $m$, also communicating with the pipes $k$, lead along the under side of the generator-chamber and are also provided with perforations on the side facing the bottom of the chamber. The entire generator is placed in the fire-tube or combustion-chamber $n$, which is provided with a lining of refractory material $o$ at a slight distance from its walls, such lining being provided with perforations for the passage of the hot gases and serving to protect the metal of the combustion-chamber against the flame-jets. One of the pipes $k$ can also be provided with a branch $p$, through which any superfluous gas generated can be led off to another place of consumption or to a gas-holder.

The action of the above-described arrangement of gas-generator is as follows: The generator-chamber $a$ having been charged with the reducing material, a mixture of air and petroleum alone is supplied through pipe $c$. The petroleum-vapors mixed with air issue through the pipes $l$ and $m$ and are ignited. By the direct action of the flame-jets issuing from the pipes $m$ and by the radiated heat from the jets of the pipes $l$ the gas-generator is gradually heated up. After a time it will be sufficiently hot to allow a small quantity of water to enter, which will be evaporated in the chamber, the steam becoming decomposed by the flame-jets of the petroleum-vapor, and the constituents then entering into combustion a further development of heat will be effected. After a short time the layer of reducing material will have become heated to incandescence, whereupon the supply of water is increased and that of petroleum is reduced, so that in the normal working there will be produced a gaseous mixture composed of hydrogen, hydrocarbon, and carbon monoxid, which in issuing in the form of flame-jets from the pipes $l$ and $m$ serves both as the heating medium for the combustion-chamber and for maintaining the gas-generator at the required working temperature, all heat absorbed by the decomposition of the water being regained by the combustion of the gases generated, while the liquid combustible makes good all losses of heat. Any surplus gas generated can be led off through pipe $p$.

In the arrangement shown at Fig. 4 two generator-chambers $a'$ and $a^2$ are connected together, these being arranged in the same way as the chamber $a$ of the first-described construction. The spaces below the grates or perforated partitions $b'$ $b^2$ are connected together by a pipe $q$. The gases generated pass into the pipe $k$, common to both chambers, from which pipe the pipes $l$ branch off in an upward direction, being provided with perforations at top underneath the lining of the combustion-chamber. Each generator has a supply-tube $c'$ $c^2$, which, as in the first construction, communicates with an air-supply, a supply of water under pressure, and a petroleum-supply. This apparatus is worked in such manner that on starting liquid combustible and air are introduced into the generator-chamber $a'$, the apparatus $a^2$ not being started at first. The generator $a^2$ is then also started, after which both generators are maintained in working in the same way as described with reference to the first arrangement. The petroleum-supply can then be cut off either at intervals or permanently in the one or the other generator-chamber $a'$ or $a^2$. Should such chamber become too much cooled down by the introduction of too much water or from any other cause, it can be heated up again by a renewed supply of petroleum.

What I claim is—

In a gas-generator, the combination of a chamber with a grate that divides the chamber into an upper and a lower compartment, a feed-pipe entering the upper compartment, a pair of transverse pipes communicating with the lower compartment, and upper and lower perforated pipes that connect the transverse pipes, substantially as specified.

In witness whereof I have hereunto signed my name in the presence of two subscribing witnesses.

PETER STIENS.

Witnesses:
ABRAHAM VANDER SCHUYT, Jr.,
JOHANNES D. FÜHRING.